Patented Nov. 1, 1932

1,885,292

UNITED STATES PATENT OFFICE

RICHARD M. RITTER, OF KEW GARDENS, NEW YORK

MOTHPROOFING COMPOSITION

No Drawing.    Application filed June 5, 1928.    Serial No. 283,136.

My invention relates to mothproofing compositions. It is a particular object of my invention to improve the composition of matter set forth in the U. S. Patent No. 1,610,167. This patent discloses a method of preparing a composition which has valuable properties for rendering animal fibres immune from the ravages of moth larvæ and which consists of salts of alkaloids from seeds of Lupinus with saponins of quillaia and a sodium salt of an inorganic acid, with the exception of sulfuric acid, said salts being simple or complex.

Extensive experimentation with said patented preparation has disclosed that a great advantage can be obtained if mordants, especially metal mordants, are added thereto. It has been found that the addition of such mordants render the fixation of said composition in the fibre more permanent. These mordants which are well known to the art of dyeing have no special value as insecticides. But when they are combined with the described salts of alkaloids from seeds of Lupinus with saponins of quillaia and the sodium salt of an inorganic acid, they prolong the mothproofing effect of said substances and consequently enhance their value. The combination of the mordants and the above described salts can be used as such, but added benefits are obtained when small quantities of either inorganic or organic acids are combined therewith.

My invention contemplates the addition of such mordants as chrome salts, for example, sodium, potassium and ammonium bichromate, chrome alum, aluminium salts, for example, the various grades of alum, aluminium sulphate and aluminium bisulphate, titanium salts, antimony salts and zinc salts. But 1 do not intend to limit my invention to these specific mordants since other equally well known mordants can be used with equal success.

The following are specific examples of my new moth-proofing composition in which the parts are given by weight:

Example I 10 parts of the above described alkaloidal salt 1 part of chrome alum

Example II 10 parts of the above described alkaloidal salt 2 parts of aluminium sulphate

Example III 10 parts of the above described alkaloidal salt 1 part of alum 1 part of titanium sodium fluroid

Example IV 10 parts of the above described alkaloidal salt 2 parts of alum 1 part boric acid In the above examples I may use other metal mordants or mixtures of metal mordants.

Having thus described my invention what I claim as new and desire to protect by Letters Patent is:—

1. A mothproofing composition comprising a mixture of alkaloidal salts from seeds of Lupinus with saponins of quillaia, the sodium salt of an inorganic acid other than sulphuric acid and a metal mordant.

2. A mothproofing composition comprising a mixture of alkaloidal salts from seeds of Lupinus with saponins of quillaia, the sodium salt of an inorganic acid other than sulphuric acid, a metal mordant and an inorganic acid.

3. A mothproofing composition comprising a mixture of alkaloidal salts from seeds of Lupinus with saponins of quillaia, the sodium salt of an inorganic acid other than sulphuric acid and an aluminium sulphate.

4. A mothproofing composition comprising a mixture of alkaloidal salts from seeds of Lupinus with saponins of quillaia, the sodium salt of an inorganic acid other than sulphuric acid and alum.

5. A mothproofing composition comprising a mixture of alkaloidal salts from seeds of Lupinus with saponins of quillaia, the sodium salt of an inorganic acid other than sulphuric acid, alum and titanium sodium fluoride.

6. A mothproofing composition comprising a mixture of alkaloidal salts from seeds of Lupinus with saponins of quillaia, the sodium salt of an inorganic acid other than sulphuric acid, alum and boric acid.

7. A mothproofing composition comprising a mixture of alkaloidal salts from seeds of Lupinus with saponins of quillaia and a metal mordant.

8. A mothproofing composition comprising a mixture of alkaloidal salts from seeds of Lupinus with saponins of quillaia, a metal mordant and an inorganic acid.

9. A mothproofing composition comprising a mixture of alkaloidal salts from seeds of Lupinus with saponins of quillaia and an aluminium sulfate.

10. A mothproofing composition comprising a mixture of alkaloidal salts from seeds of Lupinus with saponins of quillaia and alum.

11. A mothproofing composition comprising a mixture of alkaloidal salts from seeds of Lupinus with saponins of quillaia, alum and titanium sodium fluoride.

12. A mothproofing composition comprising a mixture of alkaloidal salts from seeds of Lupinus with saponins of quillaia, alum and boric acid.

In testimony whereof I have hereunto set my hand.

RICHARD M. RITTER.